(12) United States Patent
Rammer et al.

(10) Patent No.: US 8,041,150 B2
(45) Date of Patent: Oct. 18, 2011

(54) METHOD AND APPARATUS FOR DETERMINING THE SURFACE AREA OF A THREADED FASTENER

(75) Inventors: Douglas R. Rammer, Janesville, WI (US); Samuel L. Zelinka, Madison, WI (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 993 days.

(21) Appl. No.: 11/998,116

(22) Filed: Nov. 28, 2007

(65) Prior Publication Data

US 2008/0126008 A1    May 29, 2008

Related U.S. Application Data

(60) Provisional application No. 60/861,562, filed on Nov. 29, 2006.

(51) Int. Cl.
*G06K 9/32* (2006.01)
*G06K 9/00* (2006.01)
*B21H 3/02* (2006.01)
*E01B 9/10* (2006.01)

(52) U.S. Cl. ........... 382/286; 382/152; 470/57; 411/378
(58) Field of Classification Search .................. 382/152, 382/173, 286; 209/659; 470/57–86; 702/156, 702/168; 411/337, 378, 427, 439, 500, 511
See application file for complete search history.

(56) References Cited

U.S. PATENT DOCUMENTS

| 5,168,458 | A | 12/1992 | Gomes |
| 5,170,306 | A | 12/1992 | Gomes |
| 7,003,428 | B2 | 2/2006 | Hart et al. |
| 7,343,034 | B2* | 3/2008 | Jones et al. ................... 382/152 |
| 7,364,043 | B2* | 4/2008 | Ong et al. ..................... 209/652 |
| 7,404,769 | B2* | 7/2008 | Dilling ............................ 470/63 |
| 7,506,464 | B2* | 3/2009 | Tarter et al. ..................... 40/596 |

* cited by examiner

*Primary Examiner* — Kanjibhai Patel
(74) *Attorney, Agent, or Firm* — John D. Fado; Lesley D. Shaw; Janet I. Stockhausen

(57) ABSTRACT

A method and apparatus are provided for the determination of a surface area of a fastener, such as a threaded fastener. Specifically, an image of the fastener is acquired, and the image is separated into at least two regions, for instance three regions, and the surface area of each region is determined. The surface areas determined for each region are summed to determine the surface area of the fastener.

19 Claims, 4 Drawing Sheets

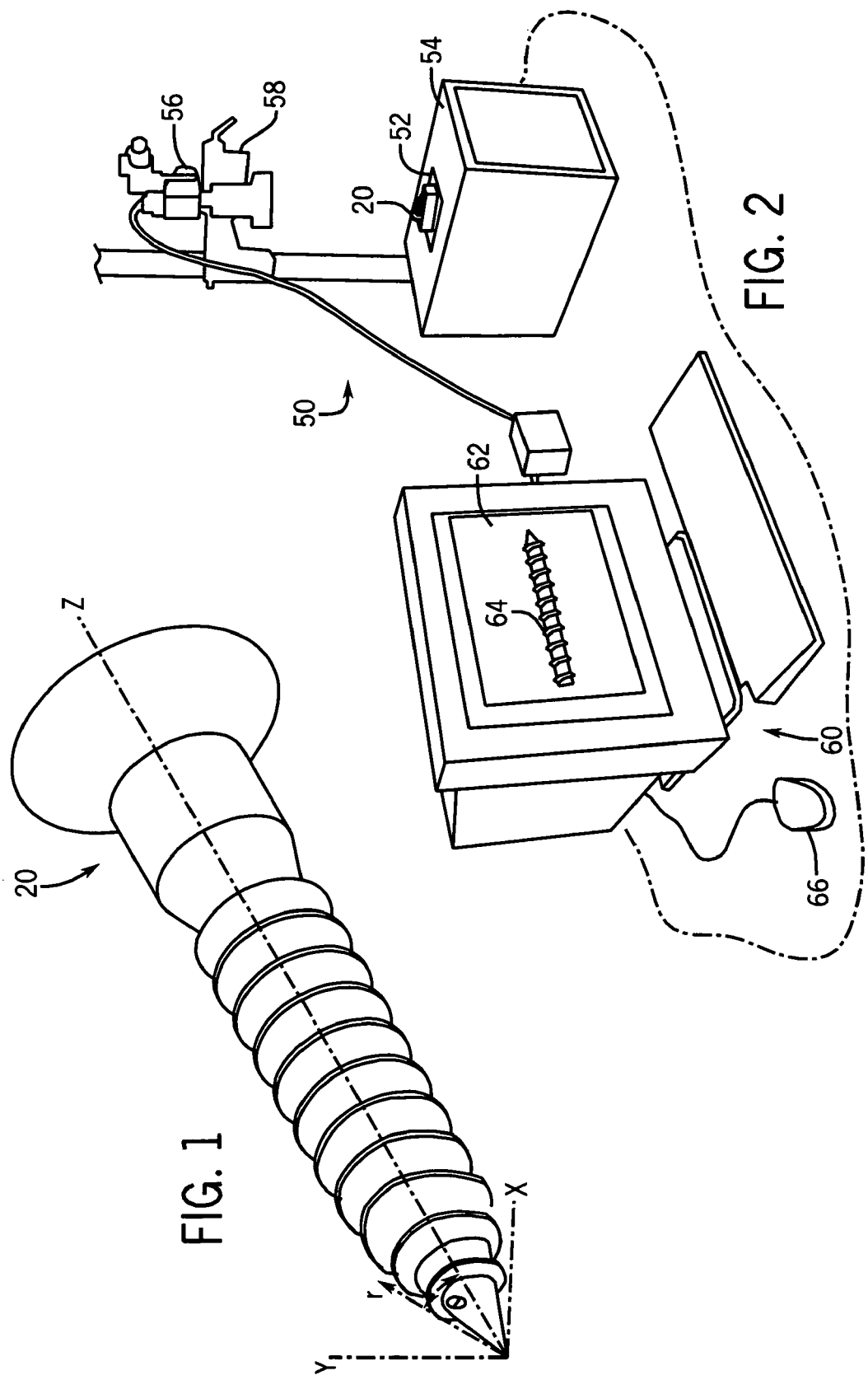

METHOD AND APPARATUS FOR DETERMINING THE SURFACE AREA OF A THREADED FASTENER

CROSS REFERENCE TO RELATED APPLICATIONS

This claims the benefit of U.S. Provisional Patent Application No. 60/861,562 filed Nov. 29, 2006, the disclosure of which is hereby incorporated by reference as if set forth in its entirety herein.

BACKGROUND OF THE INVENTION

The present invention relates generally to the determination of the surface areas of fasteners, and in particular relates to a method and apparatus for determining the surface area of a threaded fastener.

The desire to determine the corrosion rate of a fastener is founded in any given number of applications. For instance, in most timber engineering applications, wood is in intimate contact with metallic fasteners that are embedded in the wood. The last half of the $20^{th}$ century has seen an increase in the use of threaded fasteners, such as wood screws, deck screws, drywall screws, annularly threaded nails, and the like. It is well known that such fasteners are subject to corrosion due to the presence of water and oxygen in the cellular structure of wood. Conventionally, the waterborne preservative CCA (chromated copper arsenate) had been used to extend the service life of outdoor wood structures. Due to the voluntary withdrawal of CCA for residential use, many designers are now choosing to use alternatives such as ACQ (alkaline copper quaternary) and CuAz (alkaline copper azole). However, limited knowledge has been attained regarding the effects of alkaline based preservatives on the corrosion of fasteners in contact with wood.

While standard exposure tests as well as accelerated tests are known for the evaluation of corrosion of a fastener in ACQ-treated wood, the accuracy of these tests is dependent on the ability to precisely measure the various quantities used to calculate the corrosion rate. In a weight loss test, for instance, the calculation depends on the duration of the test, the mass of the fastener, and the surface area of the fastener. It has been found during corrosion testing that as the duration of the test is increased, the uncertainty in the corrosion rate measurement is increasingly dominated by uncertainties in the measurement of the surface area of the fastener.

Electrochemical corrosion tests are also being developed for fasteners in treated wood. Such tests can have lower experimental variation, thus rendering accurate calculation of surface area even more important.

Accordingly, what is needed is a method and apparatus for determining the surface area of a fastener, such as a threaded fastener. It would be further desirable that the method and apparatus for determining the surface area of a threaded fastener be versatile and applicable to determining the surface are of other fastener types, such as non-threaded fasteners.

SUMMARY OF THE INVENTION

In accordance with one aspect of the present invention, a method is provided for determining the surface area of a threaded fastener. The method includes the steps of (A) acquiring an image of the fastener and measuring parameters of the fastener on the image; (B) separating the image of the fastener into three regions including a thread region, a root region, and a body surface; (C) determining a corresponding surface area for each of the three regions based on the measured parameter; and (D) summing the corresponding surface area for each of the three regions to determine the surface area of the fastener.

In the following description, reference is made to the accompanying drawings, which form a part hereof, and in which there is shown by way of illustration, and not limitation, a preferred embodiment of the invention. Such embodiment also does not define the scope of the invention and reference must therefore be made to the claims for this purpose.

DESCRIPTION OF THE DRAWINGS

Reference is hereby made to the following drawings in which like reference numerals correspond to like elements throughout, and in which:

FIG. 1 is a perspective view of a threaded fastener;

FIG. 2 is a schematic illustration of a data acquisition system used to determine various parameters of the threaded fastener illustrated in FIG. 1;

DETAILED DESCRIPTION OF THE PREFERRED EMBODIMENT

Figure 3:
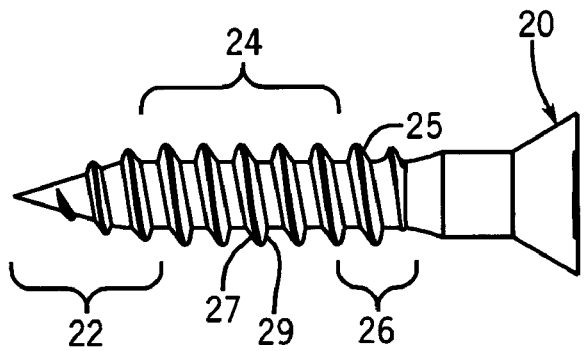
FIG. 3 is a side elevation view of the threaded fastener illustrated in FIG. 1 showing three regions of the fastener.

The corrosion rate R of an object, such as a fastener, in a weight-loss test has been conventionally calculated from Equation 1 below where $m_i$ and $m_f$ are the initial and final masses of the fastener (grams), respectively, $t_i$ and $t_f$ are the initial and final times (h) of the test, respectively, measured from the point in time when the object being tested entered the given environment, A is the initial surface area ($cm^2$) of the fastener, $\gamma$ is the density ($g/cm^3$) of the material that comprises the fastener, and $K_c$ is a corrosion rate constant (e.g., 87 600 $mm \times cm^{-1} \times h \times year^{-1}$).

$$R = K_c \frac{m_f - m_i}{A\gamma(t_f - t_i)} \quad (1)$$

An accurate determination of the corrosion performance of fasteners can be attained through generalized analytical surface area expressions for Equation 1.

Image Acquisition

The first step in determining the surface area of a fastener, such as a threaded fastener 20 of the type illustrated in FIG. 1, is to acquire an image of the fastener using a data acquisition system 50 of the type illustrated in FIG. 2. It may be desirable for the resulting image to have a high resolution with sufficient contrast to separate light and dark regions while allowing an image of the threads to be captured. The data acquisition system 50 includes a support structure 52 seated on the upper surface of a base 54. The fastener 20 can be mounted in the support structure 52 such that sufficient color contrast exists between the fastener and the background. A camera 56, which can be a Pulnix® 1320 CL digital camera having a resolution of 1020×1396 pixels is mounted above the support structure 52, and has a field of view that captures the mounted fastener 20. A light source 58 is juxtaposed with the camera 56 and has an adjustable brightness so that the user can obtain a sufficient contrast between the fastener and the background. The camera 56 captures an image of the fastener, and transfers the captured image to software, such as LabView® software, manufactured by National Instruments Corporation, located in Austin, Tex., running on any computer such as a conventional pc 60. Finally, the acquired image 64 representing the fastener can be displayed on a monitor 62 that receives video output signals from the pc 60. The camera used was commercially available by Pulnix, located in San Jose, Calif. Pulnix cameras are currently commercially available from JAI, located in San Jose, Calif. The present invention recognizes that any suitable camera capable of acquiring and communicating an image as described herein can be employed, as is understood by one having ordinary skill in the art.

Once the image 64 is acquired by the LabView® software, the user can determine various desired parameters of the threaded fastener 20 that can be used for surface area calculations. For instance, the user can identify and mark locations of interest on the acquired image via a user interface, such as a mouse 66. Such locations can include the thread width, root diameter, and other parameters used in the surface area calculations, as is described in more detail below. Specifically, the user can mark boundaries by drawing a region of interest around the edge to be located on the image 64. The program then sweeps through the region of interest to identify the edge of the image based on light-to-dark transition, and records the location (in pixels) of that boundary. Each pixel has a known length that correlates to a corresponding physical unit (e.g., mm, inches, etc). Once the features have been identified and defined, the software converts the distance of the thread characteristics in pixels into physical units. The conversion is calibrated by measuring the length (in pixels) of an object of a known size photographed with the same lens and focal length. Once the physical units of the various features have been obtained, they can be fed into the various equations described below, and software running on the pc 60 can calculate the surface area of the fastener. In accordance with certain aspects of the present invention, the LabView® software can be programmed to make the desired calculations, for instance using one or more Fortran written subroutines, as appreciated by one having ordinary skill in the art.

Application of General Surface Area Equations

In general, a point on the surface of a body is described by the position vector $$R = xi + yj + zk \quad (2)$$

To describe the entire surface, two parameters u and v are introduced such that that $$x = x(u, v), y = y(u, v), z = z(u, v) \text{ and } R = R(u, v) \quad (3)$$

Two vectors $R_u$ and $R_v$ can be defined at the intersecting point of R used in two contours. The total surface area (A) is the norm of the cross product of these two vectors, given as follows:

$$A = \int\int_J dA = \int\int_R \|\bar{R}_u \times \bar{R}_v\| du\, dv \quad (4)$$

Taking the derivatives of R and applying the equations will result in the following expression $$dA = \sqrt{EG - F^2}\, du\, dv \quad (5)$$

where $$E = \left(\frac{\partial x}{\partial u}\right)^2 + \left(\frac{dy}{\partial u}\right)^2 \left(\frac{\partial z}{\partial u}\right)^2 \quad (6)$$

$$F = \left(\frac{\partial x}{\partial u}\right)\left(\frac{\partial x}{\partial v}\right) + \left(\frac{dy}{\partial u}\right)\left(\frac{dy}{\partial v}\right) + \left(\frac{\partial z}{\partial u}\right)\left(\frac{\partial z}{\partial v}\right) \quad (7)$$

$$G = \left(\frac{\partial x}{\partial v}\right)^2 + \left(\frac{dy}{\partial v}\right)^2 \left(\frac{\partial z}{\partial v}\right)^2 \quad (8)$$

Figure 7C:
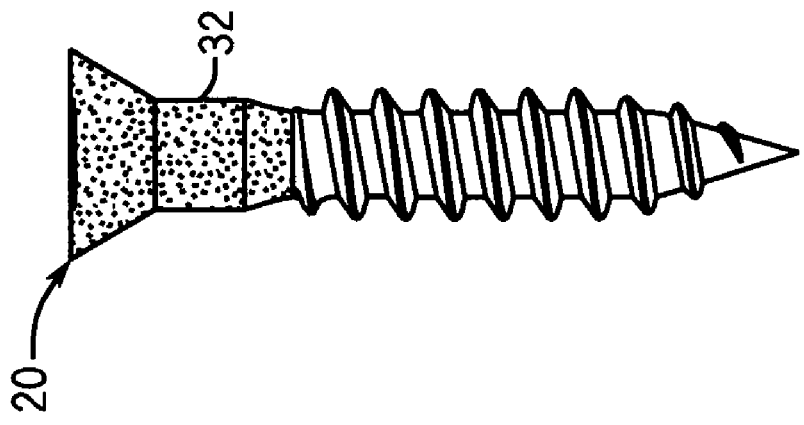
FIG. 7C is a side elevation view of the fastener similar to FIG. 7B, but showing the body surface of the fastener
Figure 7B:
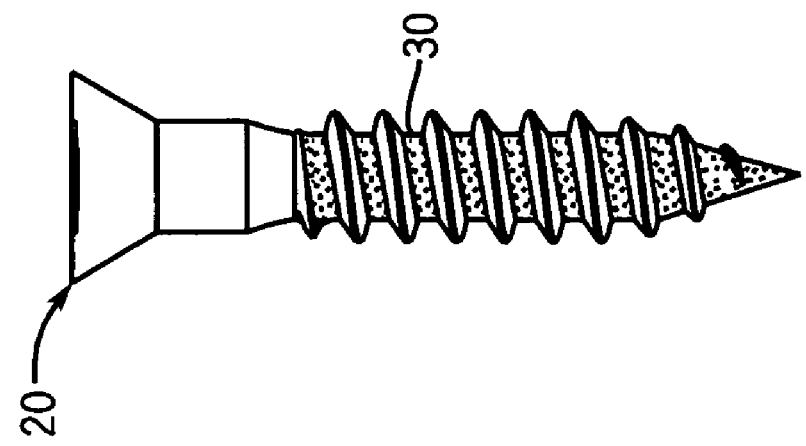
FIG. 7B is a side elevation view of the fastener similar to FIG. 7A, but showing the root region of the fastener.
Figure 7A:
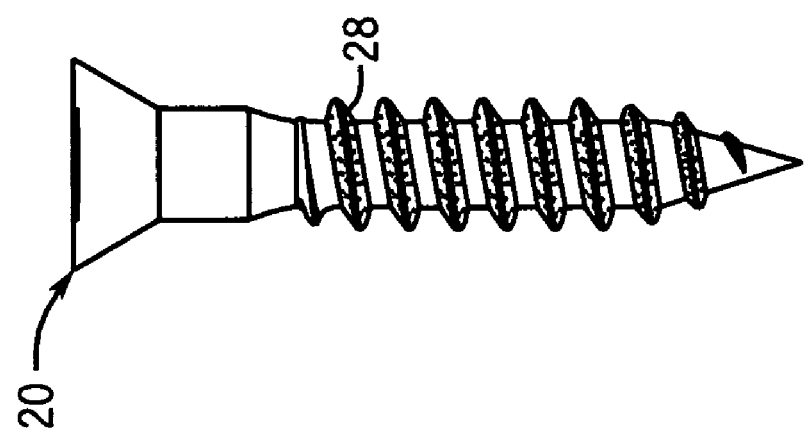
FIG. 7A is a side elevation view of the fastener illustrated in FIG. 1, illustrating the thread region of the fastener.

Certain aspects of the present invention recognizes that a fastener can be broken up into more than one region, and the application of Equations 4-8 can be applied to each region. For instance, a threaded fastener can be separated into three identifiable regions: 1) a thread region 28 shown as stippled in FIG. 7A, 2) a root region 30 (the area between the threads) shown as stippled in FIG. 7B, and 3) a body surface region 32 shown as stippled in FIG. 7C. As illustrated, the thread 28 can be a wedge-shaped thread, meaning that a cross-section of the thread 28 is wedge-shaped. The surface area of these three regions 28-32 can be determined separately, and the total surface area of the entire fastener is determined as the sum of these 3 individual surface area regions. The determination of the surface area of the thread region 28 will now be described.

The surface area of the fastener can be generally described by the following equation:

$$A = \sum_{i=1}^{n} \pi r_i^2 \Delta$$

where A is the corresponding surface area of the fastener, $r_i$ is the radius of the $i^{th}$ region, and $\Delta$ is the calibrated length of the one pixel of camera apparatus.

Surface Areas Within Threaded Region

Before presenting the general analytical surface area expression, general equations can be presented that represent the thread geometry and the resulting integral surface area expression by application of Equations 4 through 8. In general, a thread having a wedge-shaped cross-section on a fastener, such as thread 20, can be separated into three identifiable subregions and modeled by a different thread geometry equation in each subregion to find the surface area. Referring to FIG. 3, the three subregions are: (1) fastener tip subregion 22, where the thread root diameter and crest diameter are increasing, (2) threaded shank subregion 24, where the thread root diameter and crest diameter are constant or substantially constant, and (3) the mating subregion 26 where the root diameter is constant and crest diameter is decreasing to mate with the smooth shank.

Figure 4:
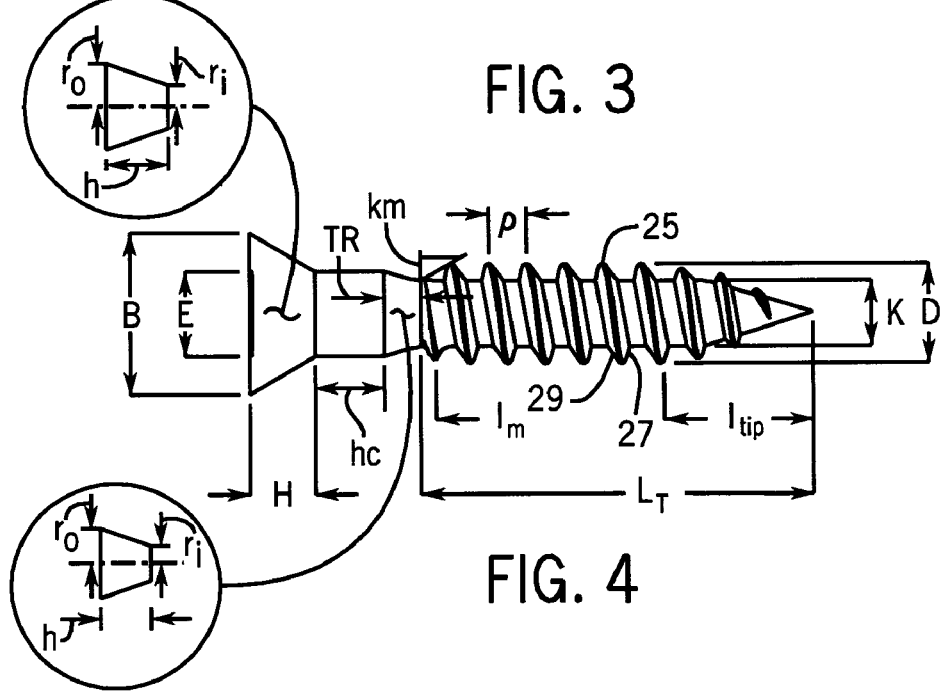
FIG. 4 is a side elevation view of the threaded fastener illustrated in FIG. 3 showing various geometric properties of the fastener, with portions enlarged.
Figure 5:
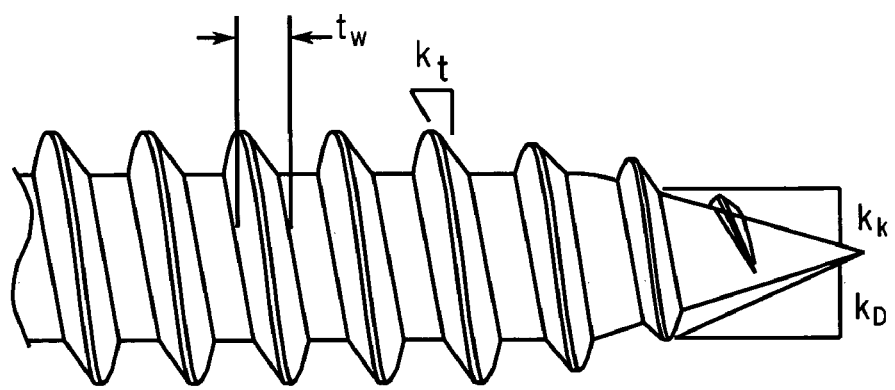
FIG. 5 is an enlarged side elevation view of the threaded fastener illustrated in FIG. 4 showing various geometric properties of the threads.

Within the fastener tip subregion 22, two expressions can be used to characterize the thread surface 25. The following expression with the plus sign represents the upper thread surface 27, while the negative sign represents the lower thread surface 29.

$$x = r\cos\theta \quad y = r\sin\theta \quad z = k_\rho \theta \pm k_t\left(\frac{k_\rho}{k_D}\theta - r\right) \quad (9)$$

Where x, y, z, and θ are illustrated in FIG. 1, and where $$k_\rho = \frac{\rho}{2\pi}, \quad k_D = \frac{r_D}{l_{tip}}, \quad k_t = \text{thread slope} = \frac{t_w}{(D-K)}, \quad t_w =$$

the thread width at the root diameter, and the remaining variables are illustrated in FIGS. 4-5.

With further reference to FIGS. 4-5, the following description is applied to the illustrated references as follows:
B=head diameter
E=shank diameter
H=head height
$h_c$=height of smooth cylindrical section
h=height of frustum of a right cone
$k_D$=slope of thread crest in tip region
$k_K$=slope of thread root in tip region
$k_m$=slope of thread crest during transition threaded to smooth shank section
$k_t$=thread slope
$l_m$=length of reducing crest diameter into smooth shank section
$l_{tip}$=distance from tip of fastener to intersection of conical and cylindrical core sections
$L_T$=distance from tip of fastener to end of threaded fastener section
K=root diameter of fastener
$r_K$=root radius of fastener, or ½*K
D=crest diameter of fastener
$r_D$=crest radius of fastener, or ½*D
$r_c$=radius of smooth cylinder, or ½*E
$r_o$=radius of larger end of a frustum of a right cone
$r_i$=radius of smaller end of a frustum of a right cone
TR=Length of smooth taper at end of threaded shank section
$t_w$=thread width at root diameter
ρ=distance between thread crests Applying equations (4) through (8), along with the upper thread surface relationship generates the following expression for that surface area, where Γ surface area and γ=density of corrosion the specimen.

$$\Gamma^{upper\ thread} = \int\int \sqrt{r^2(1+k_t^2) + \left(k_\rho - \frac{k_t k_\rho}{k_D}\right)^2}\, dr d\theta \quad (10)$$

Similarly, an expression for the lower thread surface 29 can be generated using Equation 9 with the negative sign in equations (4) through (8), which is the same general expression for the upper thread surface area, as given in (10).

$$\Gamma^{lower\ thread} = \int\int \sqrt{r^2(1+k_t^2) + \left(k_\rho - \frac{k_t k_\rho}{k_D}\right)^2}\, dr d\theta \quad (11)$$

For the upper and lower thread surface 27 and 29, respectively, in the threaded shank section 24, the following expressions describes a point on the surface $$x = r\cos\theta \quad y = r\sin\theta \quad z = k_\rho \theta \pm k_t(r_D - r) \quad (12)$$

and the corresponding surface area using Equation 12 along with Equations 4 through 8 for both the upper and lower thread surface is $$\Gamma = \iint \sqrt{r^2(1+k_\rho^2)}\, dr d\theta \quad (13)$$

For the thread surface in the mating region 26, the following expression applies for a given point on the surface $$x = r\cos\theta \quad y = r\sin\theta \quad z = k_\rho \theta \pm + k_t\left\{\left[r_D - \frac{1}{k_m}(k_\rho\theta - (L_T - l_m))\right] - r\right\} \quad (14)$$

and corresponding surface area using Equation 14 with Equations 4 through 8 is $$\Gamma^{upper\ thread} = \int\int \sqrt{r^2(1+k_t^2) + \left(k_\rho - \frac{k_t k_\rho}{k_m}\right)^2}\, dr d\theta \quad (15)$$

Similarly, an expression for the lower surface 29 can be generated using Equation 14 with the negative sign in Equations 4 through 8:

$$\Gamma^{lower\ thread} = \int\int \sqrt{r^2(1+k_t^2) + \left(k_\rho - \frac{k_t k_\rho}{k_m}\right)^2}\, dr d\theta \quad (16)$$

In general, the following expression represents the surface area of the threaded surface for all three subregions 22-26 and thread surfaces 27 and 29.

$$\Gamma = \int\int \sqrt{Tr^2 + \Psi_i^2}\, dr d\theta \quad (17)$$

where $$T = 1 + k_t^2 \quad (18)$$

$$\Psi_1 = k_\rho + \frac{k_t k_\rho}{k_D} \quad (19)$$

$$\Psi_2 = k_\rho + \frac{k_t k_\rho}{k_D} \quad (20)$$

$$\Psi_3 = k_\rho \quad (21)$$

$$\Psi_4 = k_\rho - \frac{k_t k_\rho}{k_m} \quad (22)$$

$$\Psi_5 = k_\rho + \frac{k_t k_\rho}{k_m} \quad (23)$$

in which, $\Psi_1$ and $\Psi_2$ are valid in the tip subregion 22 for the upper and lower thread surface area, respectively, $\Psi_3$ is valid in the shank subregion 24 for both the upper and lower thread surface while $\Psi_4$ and $\Psi_5$ are valid in the mating subregion 26 for the upper and lower thread surface area, respectively.

The surface area of the threaded portion of the fastener can be evaluated using the following three general cases:

$$\text{Case 1: } \Gamma = \int_{\theta_A}^{\theta_B} \int_{a+b\theta}^{c+d\theta} \sqrt{Tr^2 + \Psi_i^2} \, dr \, d\theta \quad (24)$$

$$\text{Case 2: } \Gamma = \int_{\theta_A}^{\theta_B} \int_{a}^{c+d\theta} \sqrt{Tr^2 + \Psi_i^2} \, dr \, d\theta \quad (25)$$

$$\text{Case 3: } \Gamma = \int_{\theta_A}^{\theta_B} \int_{a}^{c} \sqrt{Tr^2 + \Psi_i^2} \, dr \, d\theta \quad (26)$$

The above equations differ in terms of their limits of integration. Depending on the region of interest, different limits of integration can properly describe the geometry. General limits for the developed expression are described below in Appendix A.

In general, the thread surface area within the tip and mating subregions 22 and 26, respectively, can be determined using a combination of Equations 24 and 25. For the thread shank subregion 24, the thread surface area can be determined using a combination of Equations 2 and 26. Solving Equations 24-26 for the general limits of integration yields the following expressions for each case:

Case 1:

$$\Gamma = \int_{\theta_A}^{\theta_B} \int_{a+b\theta}^{c+d\theta} \sqrt{Tr^2 + \Psi_i^2} \, dr \, d\theta \quad (27)$$

$$= \frac{1}{2} \begin{bmatrix} \frac{\sqrt{T(c+d\theta_B)^2 + \Psi_i^2}}{Td}\left(\frac{T(c+d\theta_B)^2 + \Psi_i^2}{3} - \Psi_i^2\right) + \\ \frac{\Psi_i^2}{\sqrt{T}}\left(\theta_B + \frac{c}{d}\right)\ln\left(\sqrt{T}(c+d\theta_B) + \sqrt{T(c+d\theta_B)^2 + \Psi_i^2}\right) - \\ \frac{\sqrt{T(a+b\theta_B)^2 + \Psi_i^2}}{Tb}\left(\frac{T(a+b\theta_B)^2 + \Psi_i^2}{3} - \Psi_i^2\right) - \\ \frac{\Psi_i^2}{\sqrt{T}}\left(\theta_B + \frac{a}{b}\right)\ln\left(\sqrt{T}(a+b\theta_B) + \sqrt{T(a+b\theta_B)^2 + \Psi_i^2}\right) - \\ \frac{\sqrt{T(c+d\theta_A)^2 + \Psi_i^2}}{Td}\left(\frac{T(c+d\theta_A)^2 + \Psi_i^2}{3} - \Psi_i^2\right) - \\ \frac{\Psi_i^2}{\sqrt{T}}\left(\theta_A + \frac{c}{d}\right)\ln\left(\sqrt{T}(c+d\theta_A) + \sqrt{T(c+d\theta_A)^2 + \Psi_i^2}\right) + \\ \frac{\sqrt{T(a+b\theta_A)^2 + \Psi_i^2}}{Tb}\left(\frac{T(a+b\theta_A)^2 + \Psi_i^2}{3} - \Psi_i^2\right) + \\ \frac{\Psi_i^2}{\sqrt{T}}\left(\theta_A + \frac{a}{b}\right)\ln\left(\sqrt{T}(a+b\theta_A) + \sqrt{T(a+b\theta_A)^2 + \Psi_i^2}\right) \end{bmatrix}$$

Case 2:

$$\Gamma = \int_{\theta_A}^{\theta_B} \int_{a}^{c+d\theta} \sqrt{Tr^2 + \Psi_i^2} \, dr \, d\theta \quad (28)$$

$$= \frac{1}{2} \begin{bmatrix} \frac{\sqrt{T(c+d\theta_B)^2 + \Psi_i^2}}{Td}\left(\frac{T(c+d\theta_B)^2 + \Psi_i^2}{3} - \Psi_i^2\right) + \\ \frac{\Psi_i^2}{\sqrt{T}}\left(\theta_B + \frac{c}{d}\right)\ln\left(\frac{\sqrt{T}(c+d\theta_B) +}{\sqrt{T(c+d\theta_B)^2 + \Psi_i^2}}\right) - \\ \frac{\sqrt{T(c+d\theta_A)^2 + \Psi_i^2}}{Tb}\left(\frac{T(c+d\theta_A)^2 + \Psi_i^2}{3} - \Psi_i^2\right) - \\ \frac{\Psi_i^2}{\sqrt{T}}\left(\theta_B + \frac{c}{d}\right)\ln\left(\frac{\sqrt{T}(c+d\theta_B) +}{\sqrt{T(c+d\theta_B)^2 + \Psi_i^2}}\right) - \\ \begin{bmatrix} a\sqrt{Ta^2 + \Psi_i^2} + \\ \frac{\Psi_i^2}{\sqrt{T}}\ln\left(\sqrt{T}a + \sqrt{Ta^2 + \Psi_i^2}\right) \end{bmatrix}(\theta_B - \theta_A) \end{bmatrix}$$

Case 3:

$$\Gamma = \int_{\theta_A}^{\theta_B} \int_{a}^{c} \sqrt{Tr^2 + \Psi_i^2} \, dr \, d\theta \quad (29)$$

$$= \frac{(\theta_B - \theta_A)}{2}\begin{bmatrix} c\sqrt{Tc^2 + \Psi_i^2} + \frac{\Psi_i^2}{\sqrt{T}}\left(\sqrt{T}c + \sqrt{Tc^2 + \Psi_i^2}\right) \\ -a\sqrt{Ta^2 + \Psi_i^2} - \frac{\Psi_i^2}{\sqrt{T}}\left(\sqrt{T}a + \sqrt{Ta^2 + \Psi_i^2}\right) \end{bmatrix}$$

Root Surface Area

For the root surface area 30, defined as the surface area between the threads, the fastener tip subregion 22, where the root diameter is increasing, the threaded shank region 24 where the root diameter is constant or substantially constant, and the mating subregion 26 for the upper and lower thread surface area, respectively (see FIG. 3) can be analyzed.

For the root surface 28 in the fastener tip section 22, the following expression applies for a point on the surface:

$$x = r\cos\theta \quad y = r\sin\theta \quad z = k_K r \quad (30)$$

where $$k_K = \frac{r_K}{l_{tip}}$$

and $r_K$ is the root diameter and corresponding surface area using expressions (4) through (8) will lead to the following general expression:

$$\Gamma = \int_{\theta_A}^{\theta_B} \int_{a+b\theta}^{c+d\theta} r\sqrt{1 + k_K^2} \, dr \, d\theta \quad (31)$$

Solving for the limit of integration gives $$\Gamma = \frac{\sqrt{1+k_K^2}}{2}\begin{bmatrix}\frac{(d^2-b^2)}{3}(\theta_B^3 - \theta_A^3) + (cd - ab)(\theta_B^2 - \theta_A^2) + \\ (c^2 - a^2)(\theta_2 - \theta_1)\end{bmatrix} \quad (32)$$

For the constant root diameter region in the both the fastener shank subregion 24 and the mating subregion 26, the following expression describes a point on the surface $$x = r_K \cos\theta \quad y = r_K \sin\theta \quad z = z \quad (33)$$

The corresponding surface area using expressions (4) through (8) leads to the following general Equation $$\Gamma = \int_{\theta_A}^{\theta_B} \int_{a+b\theta}^{c+d\theta} r_K \, dz \, d\theta \quad (34)$$

Solving for the limit of integration gives the following Equation $$\Gamma = r_K \left[ \frac{(d-b)}{2}(\theta_B^2 - \theta_A^2) + (c-a)(\theta_2 - \theta_1) \right] \quad (35)$$

Flat Crest Surface Area

Similar expression for the surface area of a thread region 28 contain as flat surface at the top of the thread can be generated using a similar approach as described above with respect to the root surface area 30. Within the tip subregion 22, the following Equation 36 above applies for a point on the surface:

$$x = r\cos\theta \quad y = r\sin\theta \quad z = k_D r \quad (36)$$

where $$k_D = \frac{r_D}{l_{tip}}$$

and $r_K$ is the root diameter and corresponding surface area using expressions (4) through (8) will lead to the following general expression:

$$\Gamma = \int_{\theta_A}^{\theta_B} \int_{a+b\theta}^{c+d\theta} r\sqrt{1+k_K^2} \, dr \, d\theta \quad (37)$$

For the constant root diameter region in the both the fastener shank subregion he mating subregion 26, the following expression describes a point on the surface $$x = r\cos\theta \quad y = r_D \sin\theta \quad z = z \quad (38)$$

The corresponding surface area using expressions (4) through (8) leads to the following general Equation $$\Gamma = \int_{\theta_A}^{\theta_B} \int_{a+b\theta}^{c+d\theta} r_K \, dz \, d\theta \quad (39)$$

Body Surface Area

Outside the regions where the threads exist, expressions for the body surface areas can be generated from conventional expressions. Several expressions can be used (depending of the geometry of the fastener of interest) but it is likely that the following two geometric shapes are applicable to all fasteners that include a cylinder and a frustum of a right circular cone. The surface area of the body of a cylinder is given by $$\Gamma = 2\pi r_c h_c \quad (40)$$

where $r_c$ is the radius and $h_c$ is the height of the cylinder. The surface area of the frustum is $$\Gamma = \pi(r_0 + r_1)\sqrt{(r_0+r_1)^2 + h^2} \quad (41)$$

where $r_0$ and $r_1$ are the radii for each end of the frustum and h is the distance between the parallel circles. By summing the surface area expression for the thread surface and body, the entire surface area of the threaded fastener can be determined, as further described by the example below.

EXAMPLE

In general the application of the above expression consists of defining the limits of integration relative to the tip of the fasteners. The following example applies developed surface area equations to a No. 10-2.54 cm (1-in long) wood screw (i.e., fastener 20 of the type illustrated in FIG. 3). According to the ASME, the screw 20 has the following geometric parameters for a cut thread type:

TABLE 1

| Geometric Parameters for exemplary cut thread type screw | |
|---|---|
| Body Diameter | E = 0.483 cm (0.190-in.) |
| Thread Major Diameter | D = 0.483 cm (0.190-in.) |
| Thread Minor Diameter | K = 0.330 cm (0.130-in.) |
| Thread Thickness | $t_w$ = 0.124 cm (0.049-in.) |
| Thread Spacing | $\rho$ = 0.196 cm (0.077-in.) |
| Tip Length | $l_{tip}$ = 0.476 cm (0.188-in) |
| Thread Length | $L_T$ = 1.667 cm (0.656-in) |
| Reduction Length | $l_m = \rho$ |
| Taper | TR = 0.318 cm (0.125-in) |
| Head Height | H = 0.295 cm (0.116-in.) |
| Head Diameter | B = 0.889 cm (0.350-in.) |

For each three major thread regions (tip, shank, and mating regions) along with the transition for the tip to threaded shank, general analytical expressions for the limits of integration are given in Appendix A below. Expressions are general to any fastener with a wedge shaped fastener that satisfies the assumptions used to derive Equations 27-29, 32, and 35. To model the root surface geometry during the transition between the tip and shank regions both Equations 30 and 33 are utilized. Equation 30 is applied to model the geometry until $z = l_{tip}$, while Equation 33 is valid for $z > l_{tip}$. Stated differently, Equation 30 is used to model the geometry until the inner diameter of the fastener tip subregion equals the thread minor diameter, which will occur at $l_{tip}$ from the fastener end, and thereafter by Equation 33. Actual fasteners tend to have a gradual transition in this region. This simplified approach will slightly overestimate the actual surface area, as determined by surface area Equations 32 and 35, but the overestimate will be small and therefore negligible.

For the No. 10-2.54 cm long wood screw surface area equations, limits of integration (using the expression shown in Appendix A), and calculated surface area for each model part of the fastener is shown in Table 2.

Comparison to Numerical Analysis and Surface Area Estimates

The No. 10-2.54 cm (1-in long) wood screw was modeled using same geometric equations (9), (12), (14), (30), and (33), to develop the general surface area integrals formulas, along with the expressions for the smoothed taper, smooth cylinder shank, and the fastener head.

Figure 6:
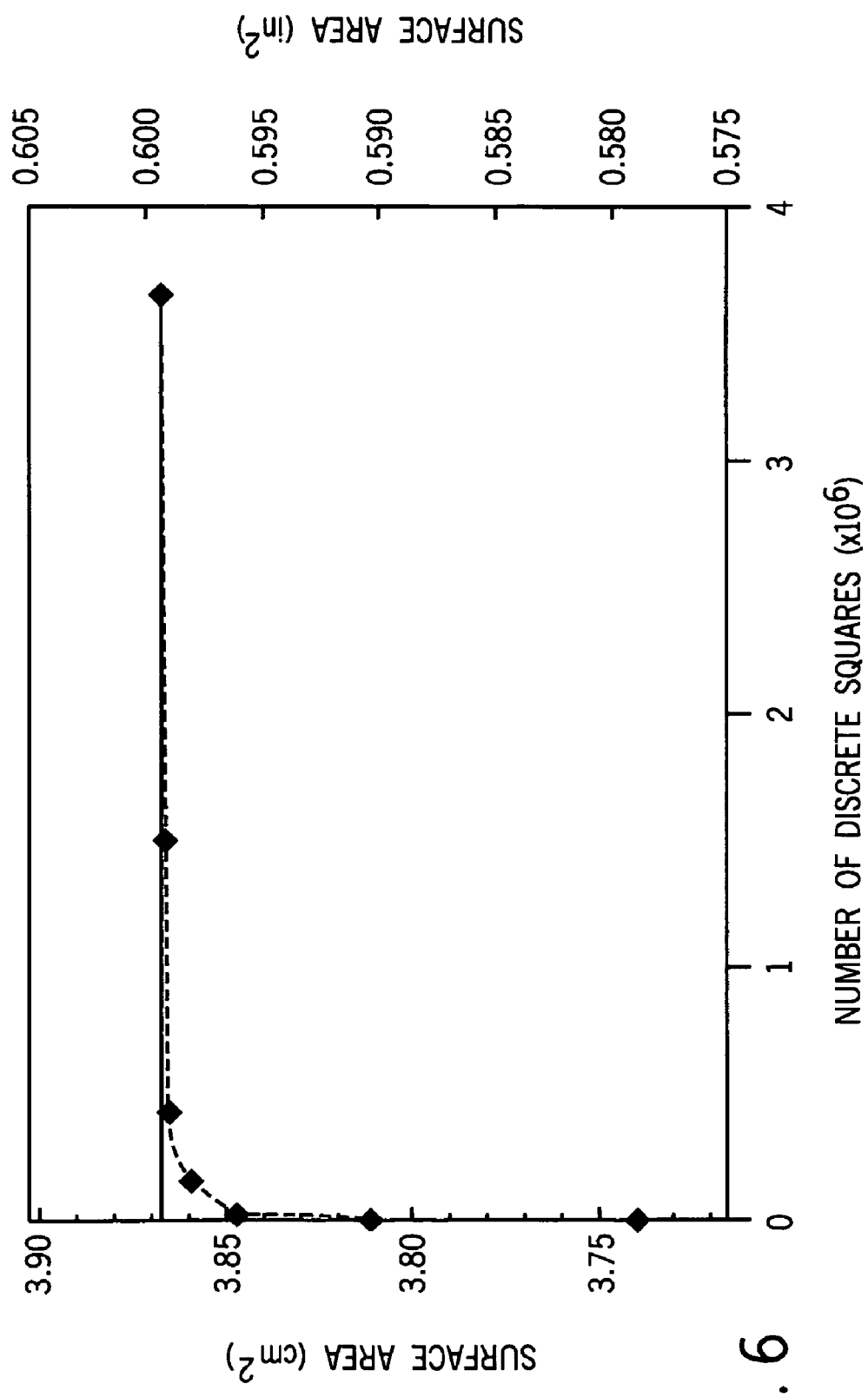
FIG. 6 is a graph illustrating surface area calculated by an approximate numerical analysis according to analytical solutions in accordance with certain aspects of the present invention.

Using the geometric model data, the surface area was determined numerically by discretizing the model into a number of grids, taking the norm of the cross products of the vectors at each one of these grids and summing the results over the entire model. FIG. 6 shows the results of the numerical analysis along with the analytical solutions. It is seen the numerical solution converges to the analytic solution as the number of grids increases and validates the general analytical expression for surface area.

TABLE 2

Surface area results for each location and total for No 10 - 2.54 cm (1-in.) long wood screw.

| Region | Calculation surface | Eqn | Outer integrand limit $\theta_A$ | $\theta_B$ | Inner integrand limits a + bθ a | b | c + dθ C | d | Surface Area cm 1000 |
|---|---|---|---|---|---|---|---|---|---|
| Tip | Upper thread | 27(1) | 0 | 13.926 | ... | 0.0119 | ... | 0.0157 | 64.71 |
|  | Lower thread | 27(2) | 0 | 15.341 | ... | 0.0088 | ... | 0.0157 | 133.03 |
|  | Root area | 32 | 0 | 6.283 | ... | ... | ... | 0.0088 | 9.82 |
|  | Root area | 32 | 6.283 | 15.341 | −0.0745 | 0.0119 | ... | 0.0088 | 79.77 |
| Tip - shank | Upper thread | 28(1) | 13.926 | 15.341 | 0.1651 | ... | ... | 0.0157 | 23.88 |
| Transition | Lower thread | 28(2) | 15.341 | 17.340 | 0.2413 | ... | −0.0949 | 0.0150 | 46.09 |
|  | Root area - tip | 32 | 15.341 | 17.340 | −0.0745 | 0.0119 | −0.0949 | 0.0150 | 25.52 |
|  | Root area - tip | 32 | 17.340 | 20.209 | −0.0745 | 0.0119 | 0.1651 | ... | 22.96 |
|  | Root area - shank | 35 | 17.340 | 20.209 | 0.4775 | ... | −0.0622 | 0.0311 | 21.15 |
| Shank | Upper thread | 29(3) | 15.341 | 47.246 | 0.1651 | 0.2413 | −0.0622 | 0.0311 | 642.36 |
|  | Lower thread | 29(3) | 17.340 | 47.246 | 0.1651 | 0.2413 | −0.0622 | 0.0311 | 602.11 |
|  | Root area | 35 | 20.209 | 47.246 | −0.1334 | 0.0311 | −0.0622 | 0.0311 | 317.47 |
| Mating | Upper thread | 28(4) | 47.246 | 53.529 | 0.1651 | ... | 0.8143 | −0.0121 | 59.10 |
|  | Lower thread | 28(5) | 47.246 | 53.529 | 0.1651 | ... | 0.8143 | −0.0121 | 59.70 |
|  | Root | 35 | 47.246 | 53.529 | −0.1334 | 0.0311 | −0.5302 | 0.0410 | 106.05 |
|  | Root | 35 | 53.529 | 59.812 | 0.3968 | 0.0212 | 1.6662 | ... | 69.17 |

+TC Total Thread Surface Area: 2282.88

|  |  | Eqn. | $r_i$ | $r_o$ | h | $r_c$ | $h_c$ | ... |  |
|---|---|---|---|---|---|---|---|---|---|
| Body | Taper | 33 | 0.165 | 0.242 | 0.318 | ... | ... | ... | 416.88 |
|  | Shank | 32 | ... | ... | ... | 0.242 | 0.262 | ... | 396.65 |
|  | Head | 33 | 0.242 | 0.444 | 0.295 | ... | ... | ... | 771.16 |

Total Surface Area: 3867.56

Where The number in parenthesis under the "Eqn" column denotes the Ψ used in equations: 1=$\Psi_1$, 2=$\Psi_2$, 3=$\Psi_3$, 4=$\Psi_4$, and 5=$\Psi_5$; and $$\int_a^b f(x)\,dx = -\int_b^a f(x)\,dx$$

was utilized for calculation of surface area of the lower thread for the tip-shank transition

Comparison of Surface Area Expression to Simplified Area Models

Due to the involved nature of calculating the surface area, it can be useful to determine how closely the area can be approximated with simplifying assumptions. The percent error will be calculated for four simplified models to determine the surface area. Since the only difference in these simplified models (estimates) and detailed expression is the treatment of the threaded portion of the fasteners, only these differences will be discussed. All estimates start with the minimum surface area of the root radius and idealize the tip as a cone, (Equation 42). The first estimate approximates the threaded surface are right frustum placed back to back that extends the entire length of the threaded portion including the tip (Equation 43). The second estimate is the same as the first estimate but excludes threads in the tip region. Estimates three (Equation 45) and four (Equation 46) are the same as estimates one and two but increase the thread surface area using the ratio of the angled thread length to perpendicular threaded length. Equations for the base surface and four estimates are as follows:

$$\Gamma_b = \pi r_K \sqrt{r_K^2 + l_{tip}^2} + 2\pi r_K (L_T - l_{tip}) \quad (42)$$

$$\Gamma_1 = \Gamma_b + 2\pi \frac{(L_T - l_{tip})}{\rho}\left[(r_D + r_K)\sqrt{(r_D - r_K)^2 + t_w^2/4} - r_K t_w\right] \quad (43)$$

$$\Gamma_2 = \Gamma_b + 2\pi \frac{L_T}{\rho}\left[(r_D + r_K)\sqrt{(r_D - r_K)^2 + t_w^2/4} - r_K t_w\right] \quad (44)$$

$$\Gamma_3 = \Gamma_b + 2\pi \frac{(L_T - l_{tip})}{\rho}\left[(r_D + r_K)\sqrt{(r_D - r_K)^2 + t_w^2/4} - r_K t_w\right] \quad (45)$$

$$\Gamma_1 = \Gamma_b + 2\pi \frac{L_T}{\rho}\left[(r_D + r_K)\sqrt{(r_D - r_K)^2 + t_w^2/4} - r_K t_w\right] \frac{\sqrt{(2\pi r_D)^2 + \rho^2}}{2\pi r_D} \quad (46)$$

Using these four estimates, a comparison to the analytical expression can be undertaken. The absolute difference and percent difference between estimates and analytical formulas are given in Table 3. From this table, the percent difference ranges between −1.06% and 6.71% for the four models considered.

TABLE 3

Comparison of surface area expressions and simplified models

| Estimate No. | Surface Area (cm²) Simplified | Analytical | Difference | Percent Difference |
|---|---|---|---|---|
| 1 | 4.120 | 3.869 | 0.251 | 6.49 |
| 2 | 3.822 | 3.869 | −0.047 | −1.22 |

TABLE 3-continued

Comparison of surface area expressions and simplified models

| Estimate No. | Surface Area (cm²) | | | Percent Difference |
|---|---|---|---|---|
| | Simplified | Analytical | Difference | |
| 3 | 4.129 | 3.869 | 0.260 | 6.71 |
| 4 | 3.828 | 3.869 | −0.041 | −1.06 |

Advantageously, certain aspects of the present invention provide for the determination of the surface area of a threaded fastener, thereby removing one of the barriers to determining the corrosion rates of screws and threaded nails, quantitatively. For a wedge-shaped thread profile, general surface area expressions for both the threads and area between the thread roots were developed for the tip, threaded shank, and mating regions of the fastener. These analytical expressions were applied to a specific wood screw to highlight the surface area calculation procedure and to validate the expression by comparison to a numerical procedure. Use of these expressions along with an imaging system will allow for the determination of the surface area for a wide range of threaded fasteners.

Furthermore, for fasteners that may not include all three of the tip, threaded shank, and mating regions, the above method can be applied to determine the surface area of only those regions that exist, and those determined surface areas can be summed determine the surface area of the fastener. Accordingly, the present invention is also applicable to other types of fasteners than the fastener illustrated in FIG. 1, such as unthreaded fasteners.

APPENDIX A

Table A 1-Equations and integration limits for tip region of fastener
(UT = upper thread, LT = lower thread and RT = root).

| | | Theta | | Radius | |
|---|---|---|---|---|---|
| Surface | Eqn.[1] | Lower limit $\theta_A$ | Upper limit $\theta_B$ | Lower Limit $a + b\theta$ | Upper Limit $c + d\theta$ |
| UT | 35(1) | 0 | $\dfrac{[k_t r_K + l_{tip}]}{k_\rho\left(1 + \dfrac{k_t}{k_D}\right)}$ | $\dfrac{k_\rho\left(1 + \dfrac{k_t}{k_D}\right)}{k_K + k_t}\theta$ | $\dfrac{k_\rho}{k_D}\theta$ |
| LT | 35(2) | 0 | $\dfrac{l_{tip}}{k_\rho}$ | $\dfrac{k_\rho\left(1 + \dfrac{k_t}{k_D}\right)}{k_K + k_t}\theta$ | $\dfrac{k_\rho}{k_D}\theta$ |
| RT | 41 | 0 | $2\pi$ | 0 | $\dfrac{k_\rho\left(1 - \dfrac{k_t}{k_D}\right)}{k_K - k_t}\theta$ |
| RT | 41 | $2\pi$ | $\dfrac{l_{tip}}{k_\rho}$ | $-\dfrac{\rho\left(1 + \dfrac{k_t}{k_D}\right)}{k_K + k_t} + \dfrac{k_\rho\left(k_\rho + \dfrac{k_t k_\rho}{k_D}\right)}{k_K + k_t}\theta$ | $\dfrac{k_\rho\left(1 - \dfrac{k_t}{k_D}\right)}{k_K - k_t}\theta$ |

[1]Number in parenthesis denotes the Ψ used in equations: 1 = Ψ₁, 2 = Ψ₂, 3 = Ψ₃, 4 = Ψ₄, and 5 = Ψ₅

Table A 2-Equations and integration limits for region connecting the tip to threaded shank of fastener
(UT = upper thread, LT = lower thread and RT = root).

| | | Theta (angle variable) | | Radius | |
|---|---|---|---|---|---|
| Surface | Eqn.[32] | Lower limit $\theta_A$ | Upper limit $\theta_B$ | Lower Limit $a + b\theta$ | Upper Limit $c + D\theta$ |
| UT | 36(1) | $\dfrac{[k_t r_K + l_{tip}]}{k_\rho\left(1 + \dfrac{k_t}{k_D}\right)}$ | $\dfrac{l_{tip}}{k_\rho}$ | $r_K$ | $\dfrac{k_t}{k_D}\theta$ |
| LT | 36(2) | $\dfrac{l_{tip}}{k_\rho}$ | $\dfrac{[r_K(k_K - k_t) + k_t r_D]}{k_\rho}$ | $\dfrac{-k_t r_d}{(k_k - k_t)} + \dfrac{k_\rho}{(k_k - k_t)}\theta$ | $r_D$ |
| RT | 41 | $\dfrac{l_{tip}}{k_\rho}$ | $\dfrac{[r_K(k_K - k_t) + k_t r_D]}{k_\rho}$ | $-\dfrac{\rho\left(1 + \dfrac{k_t}{k_D}\right)}{k_K + k_t} + \dfrac{\left(k_\rho + \dfrac{k_t k_\rho}{k_D}\right)}{k_K + k_t}\theta$ | $\dfrac{-k_t r_d}{(k_k - k_t)} + \dfrac{k_\rho}{(k_k - k_t)}\theta$ |
| RT | 41 | $\dfrac{[r_K(k_K - k_t) + k_t r_D]}{k_\rho}$ | $\dfrac{[k_t r_K + l_{tip}]}{k_\rho\left(1 + \dfrac{k_t}{k_D}\right)} + 2\pi$ | $-\dfrac{\rho\left(1 + \dfrac{k_t}{k_D}\right)}{k_K + k_t} + \dfrac{\left(k_\rho + \dfrac{k_t k_\rho}{k_D}\right)}{k_K + k_t}\theta$ | $r_K$ |

Table A 2-Equations and integration limits for region connecting the tip to threaded shank of fastener
(UT = upper thread, LT = lower thread and RT = root).

| | | Theta (angle variable) | | Radius | |
|---|---|---|---|---|---|
| Surface | Eqn.[2] | Lower limit $\theta_A$ | Upper limit $\theta_B$ | Lower Limit $a + b\theta$ | Upper Limit $c + D\theta$ |
| RT | 44 | $\dfrac{[r_K(k_K - k_t) + k_t r_D]}{k_\rho}$ | $\dfrac{[k_t r_K + l_{tip}]}{k_\rho\left(1 + \dfrac{k_t}{k_D}\right)} + 2\pi$ | $l_{tip}$ | $-k_t(r_D - r_K) + k_\rho\theta$ |

[2]Number in parenthesis denotes the $\Psi$ used in equations: $1 = \Psi_1$, $2 = \Psi_2$, $3 = \Psi_3$, $4 = \Psi_4$, and $5 = \Psi_5$ Table A 3-Equations and integration limits for the threaded shank region of fastener
(UT = upper thread, LT = lower thread and RT = root).

| | | Theta (angle variable) | | Radius | |
|---|---|---|---|---|---|
| Surface | Eqn[3] | Lower limit $\theta_A$ | Upper limit $\theta_B$ | Lower Limit $a + b\theta$ | Upper Limit $c + d\theta$ |
| Upper Thread | 29(3) | $\dfrac{l_{tip}}{k_\rho}$ | $\dfrac{L_T - l_m}{k_\rho}$ | $r_K$ | $r_D$ |
| Lower Thread | 29 | $\dfrac{[r_K(k_K - k_t) + k_t r_D]}{k_\rho}$ | $\dfrac{L_T - l_m}{k_\rho}$ | $r_K$ | $r_D$ |
| Root | 35 | $\dfrac{[k_t r_K + l_{tip}]}{k_\rho\left(1 + \dfrac{k_t}{k_D}\right)} + 2\pi$ | $\dfrac{L_T - l_m}{k_\rho}$ | $k_t(r_D - r_K) - \pi + k_\pi\theta$ | $-k_t(r_D - r_K) + k_\rho\theta$ |

[3]Number in parenthesis denotes the $\Psi$ used in equations: $1 = \Psi_1$, $2 = \Psi_2$, $3 = \Psi_3$, $4 = \Psi_4$, and $5 = \Psi_5$ Table A 4-Equations and integration limits for the region connecting the threaded shank to the smooth shank region of fastener (UT = upper thread, LT = lower thread and RT = root).

| | | Theta (angle variable) | |
|---|---|---|---|
| Surface | Eqns[4] | Lower limit, $\theta_A$ | Upper limit, $\theta_B$ |
| UT | 28(4) | $\dfrac{L_T - l_m}{k_\rho}$ | $\dfrac{L_T - \dfrac{k_t}{k_m}(L_T - l_m) - (r_D - r_K)k_t}{k_\rho\left(1 - \dfrac{k_t}{k_m}\right)}$ |
| UT[5] | 27(4) | $\dfrac{L_T - \dfrac{k_t}{k_m}(L_T - l_m) - (r_D - r_K)k_t}{k_\rho\left(1 - \dfrac{k_t}{k_m}\right)}$ | $\dfrac{L_T}{k_\rho}$ |
| LT | 28(5) | $\dfrac{L_T - l_m}{k_\rho}$ | $\dfrac{L_T}{k_\rho}$ |
| LT[9] | 28(5) | $\dfrac{L_T}{k_\rho}$ | $\dfrac{L_T + \dfrac{k_t}{k_m}(L_T - l_m) + (r_D - r_K)k_t}{k_\rho\left(1 + \dfrac{k_t}{k_m}\right)}$ |
| RT | 35 | $\dfrac{L_T - l_m}{k_\rho}$ | $\dfrac{L_T - l_m}{k_\rho} + 2\pi$ |

Table A 4-Equations and integration limits for the region connecting the threaded shank to the smooth shank region of fastener (UT = upper thread, LT = lower thread and RT = root).

| | | | |
|---|---|---|---|
| RT[9] | 35 | $\dfrac{L_T - l_m}{k_\rho} + 2\pi$ | $\dfrac{L_T + \dfrac{k_t}{k_m}(L_T - l_m) + (r_D - r_K)k_t}{k_\rho\left(1 + \dfrac{k_t}{k_m}\right)}$ |
| RT | (35) | $\dfrac{L_T + \dfrac{k_t}{k_m}(L_T - l_m) + (r_D - r_K)k_t}{k_\rho\left(1 + \dfrac{k_t}{k_m}\right)}$ | $\dfrac{L_T - \dfrac{k_t}{k_m}(L_T - l_m) - (r_D - r_K)k_t}{k_\rho\left(1 - \dfrac{k_t}{k_m}\right)} + 2\pi$ |

| | | Radius | |
|---|---|---|---|
| Surface | Eqns[4] | Lower Limit, $a + b\theta$ | Upper Limit, $c + d\theta$ |
| UT | 28(4) | $r_K$ | $r_D + \dfrac{(L_T - l_m)}{k_m} - \dfrac{k_\rho}{k_m}\theta$ |
| UT[5] | 27(4) | $r_D + \dfrac{(L_T - l_m)}{k_m} - \dfrac{L_T}{k_t} + \dfrac{k_\rho}{k_t}\left(1 - \dfrac{k_t}{k_m}\right)\theta$ | $r_D + \dfrac{(L_T - l_m)}{k_m} - \dfrac{k_\rho}{k_m}\theta$ |
| LT | 28(5) | $r_K$ | $r_D + \dfrac{(L_T - l_m)}{k_m} - \dfrac{k_\rho}{k_m}\theta$ |
| LT[9] | 28(5) | $r_K$ | $r_D + \dfrac{(L_T - l_m)}{k_m} + \dfrac{L_T}{k_t} - k_\rho\left(\dfrac{1}{k_m} + \dfrac{1}{k_t}\right)\theta$ |
| RT | 35 | $k_t(r_D - r_K) - \rho + k_\rho\theta$ | $-k_t\left(r_D + \dfrac{(L_T - l_m)}{k_m} - r_K\right) + k_\rho\left(1 + \dfrac{k_t}{k_m}\right)\theta$ |
| RT[9] | 35 | $k_t\left(r_D + \dfrac{(\rho + L_T - l_m)}{k_m} - r_K\right) - \rho + k_\rho\left(1 - \dfrac{k_t}{k_m}\right)\theta$ | $-k_t\left(r_D + \dfrac{(L_T - l_m)}{k_m} - r_K\right) + k_\rho\left(1 + \dfrac{k_t}{k_m}\right)\theta$ |
| RT | (35) | $k_t\left(r_D + \dfrac{(\rho + L_T - l_m)}{k_m} - r_K\right) - \rho + k_\rho\left(1 - \dfrac{k_t}{k_m}\right)\theta$ | $L_T$ |

[4]Number in parenthesis denotes the $\Psi$ used in equations: $1 = \Psi_1$, $2 = \Psi_2$, $3 = \Psi_3$, $4 = \Psi_4$, and $5 = \Psi_5$
[5]Integration limit not used for No. 10-2.54 cm wood screw example since $l_m = \rho$. These expression are validate only if $l_m > \rho$.

The above description has been that of a preferred embodiment of the present invention, and it will occur to those having ordinary skill in the art that many modifications may be made without departing from the spirit and scope of the invention. In order to apprise the public of the various embodiments that may fall in the scope of the present invention, the following claims are made.

We claim:

1. A method for determining the surface area of a threaded fastener, the steps comprising:
   (A) acquiring a photographic image of the fastener with a data acquisition system, and measuring parameters of the fastener on the image;
   (B) separating the image of the fastener into three regions including a thread region, a root region, and a body surface region;
   (C) determining a corresponding surface area for each of the three regions based on the measured parameters; and
   (D) summing the corresponding surface area for each of the three regions to determine the surface area of the fastener.

2. The method as recited in claim 1, wherein the data acquisition system comprises, a support structure to which the threaded fastener is mounted, a light source, a camera configured to acquire the image, a computer executing an imaging software, a monitor displaying the image, and a user interface.

3. The method as recited in claim 2, further comprising identifying a region of interest on the image with the user interface related to a thread characteristic of interest, and calculating distances of the thread characteristics based on a pixel size of the characteristic of interest.

4. The method as recited in claim 1, further comprising separating the thread region into three subregions including a fastener tip subregion, a threaded shank subregion, and a mating subregion determining the surface area of each of the separated thread subregions and summing the surface area of each of the separated thread subregions to determine the surface area of the thread region.

5. The method as recited in claim 4, wherein the fastener tip subregion includes a location where a thread root diameter and crest diameter are increasing.

6. The method as recited in claim 4, wherein the shank subregion includes a location where a thread root diameter and crest diameter are constant or substantially constant.

7. The method as recited in claim 4, wherein the mating subregion includes a location where a root diameter is constant and a crest diameter is decreasing.

8. The method as recited in claim 4, wherein the thread region comprises a thread surface, the thread surface including an upper thread surface, and a lower thread surface, and step (C) further comprises determining the surface area for the upper and lower thread surfaces of the thread regions.

9. The method as recited in claim 4, wherein the thread region comprises a root surface, and step (C) further comprises determining the surface area for the root surface of the thread regions.

10. The method as recited in claim 4, wherein the thread region comprises a flat crest surface, and step (C) further comprises determining the surface area for the flat crest surface of the thread regions.

11. A method for determining the surface area of a fastener, the steps comprising:
   (A) acquiring a photographic image of the fastener with a data acquisition system and measuring parameters of the fastener on the image;
   (B) separating the image of the fastener into a plurality of regions having a known pixel length;
   (C) determining a corresponding surface area for each of the regions based on the measured parameters; and
   (D) summing the surface area over the plurality of regions.

12. The method as recited in claim 11, further comprising applying the following equations to each of the regions:

$$A = \sum_{i=1}^{n} \pi r_i^2 \Delta$$

where A is the corresponding surface area, $r_1$ is the radius of the $i^{th}$ region, and $\Delta$ is the calibrated length of the one pixel of camera apparatus.

13. An apparatus for determining the surface area of a threaded fastener, comprising:
   a camera configured to capture an image of an illuminated fastener that is resting on a support structure; and
   software running on a pc, the software configured to receive the captured image of the fastener from the camera, separate the fastener into at least two regions, determine the surface area of each region, then sum the surface area of each region to determine the surface area of the threaded fastener.

14. The apparatus as recited in claim 13, wherein the image of the fastener is separated into three regions including a thread region, a root region, and a body surface.

15. The apparatus as recited in claim 13, wherein the thread region is separated into three subregions including a fastener tip subregion, a threaded shank subregion, and a mating subregion, and the surface area of each of the separated thread subregions is determined and summed to determine the surface area of the thread region.

16. The apparatus as recited in claim 13, further comprising the support structure, wherein the support structure defines a mounting location for the fastener, the mounting location being positioned in the field of view of the camera.

17. The apparatus as recited in claim 13, further comprising the light source, wherein the light source is configured to direct light at the fastener.

18. The apparatus as recited in claim 17, further comprising a support structure configured to support the fastener in a field of view of the camera.

19. The apparatus as recited in claim 13, further comprising a user interface configured to identify locations of interest on the received image of the fastener, wherein the locations of interest divide the received image of the fastener into the at least two regions.

* * * * *